No. 756,185. PATENTED MAR. 29, 1904.
S. C. SCHAUER.
FRICTION CLUTCH.
APPLICATION FILED JULY 30, 1902.
NO MODEL.

WITNESSES.
E. E. Williams
O. F. Garrod

Sherman C. Schauer, INVENTOR.
By Robert S. Carr.
Atty.

THE NORRIS PETERS CO., PHOTO-LITHO., WASHINGTON, D. C.

No. 756,185.

Patented March 29, 1904.

UNITED STATES PATENT OFFICE.

SHERMAN C. SCHAUER, OF CINCINNATI, OHIO.

FRICTION-CLUTCH.

SPECIFICATION forming part of Letters Patent No. 756,185, dated March 29, 1904.

Application filed July 30, 1902. Serial No. 117,656. (No model.)

*To all whom it may concern:*

Be it known that I, SHERMAN C. SCHAUER, a citizen of the United States, residing at Cincinnati, Ohio, have invented a new and useful Improvement in Friction-Clutches, of which the following is a specification.

My invention relates to friction-clutches of the class adapted to use on drill-presses or other tools; and the objects of my improvement are to provide means to detachably engage and rotate axially-movable spindles, to provide adjustable means to compensate for the wear of the frictional surface, and to utilize the entire frictional surface of the ring. These objects are attained in the following-described manner, as illustrated in the accompanying drawings, in which—

Figure 1:
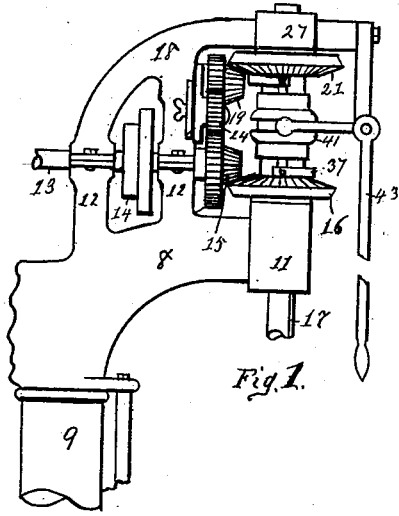
Figure 2:
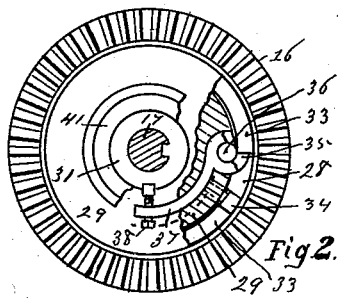
Figure 3:
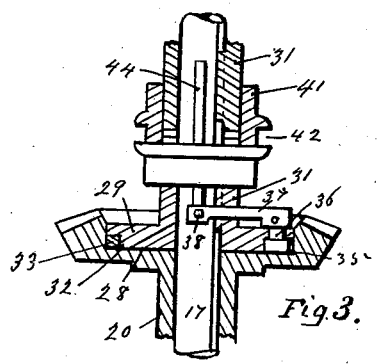
Figure 4:
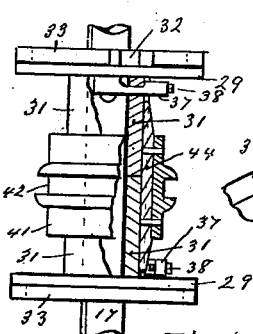
Figure 5:
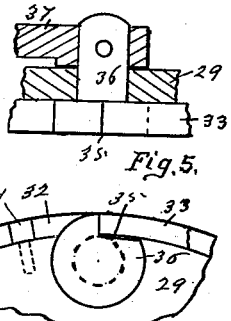
Figure 6:
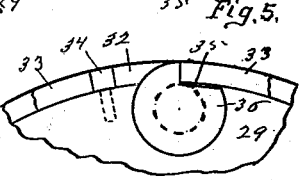

Figure 1 is a side elevation of a portion of a drill-press embodying my improvement; Fig. 2, a plan with parts in section of the spindle-driving mechanism; Fig. 3, an elevation thereof with parts in section, and Figs. 4, 5, and 6 details of construction.

In the drawings, 8 represents the main frame of a drill-press embodying my improvement, mounted on column 9 and formed with spindle-bearing 11 and shaft-bearings 12. Driving-shaft 13 is provided with stop-pulley 14 and with bevel-pinion 15, which engages with bevel-gear 16 to drive spindle 17 in a forward direction. Bracket 18 is removably secured on bearings 12, and bevel-pinion 19 and bevel-gear 21, similar to pinion 15 and gear 16, are mounted thereon and arranged to drive the spindle in a rearward direction. Said bevel-gears 16 and 21 are each formed with a hollow hub or journal 20 on the rear end, whereby they are journaled in the respective bearings 11 and 27, and the drill-spindle is vertically movable therethrough. The face of each of said gears is formed with a circular recess or counterbore 28, wherein flanges 29, formed on the respective sleeves 31, are movably seated. Said sleeves are splined on the drill-spindle between bevel-gears 16 and 21, and flanges 29 thereon are each formed with a peripheral groove or seat 32, wherein open friction-rings 33 are concealed. One end of each of said rings abuts against a corresponding stop 34, which usually consists of the head of a set-screw secured in the flange, while the other end of each ring terminates in a notch 35, formed in a pin 36, which is journaled in the corresponding flange and is provided with a curved arm 37, wherein screw 38 is adjustable. When said arm is moved in an outward direction, one side of the notch in the pin is forced against the end of the ring therein, and the ring is thereby expanded into frictional contact with the side of the recess in the corresponding bevel-gear, which causes the spindle to be rotated by the gear. Collar 41 is splined on sleeves 31 and formed with an annular groove 42, wherein shifting yoke actuated by hand-lever 43 is engaged. Spline or key 44 is secured to the collar and terminates at each end beyond the collar in the form of a wedge, which is forced under the ends of the respective screws 38 in the ends of arms 37 by the movement of the collar, whereby either of the friction-rings is expanded into frictional engagement with the corresponding bevel-gears 16 or 21 and the drill-spindle thereby rotated in either a forward or backward direction.

Having fully described my improvement, what I claim as my invention, and desire to secure by Letters Patent of the United States, is—

The combination with a bevel-gear formed with a counterbored recess in its face, a rotative spindle movable axially therethrough, a sleeve splined on the spindle and formed with a circular concentric flange, said flange being rotatively seated in said recess and formed with a peripheral seat, a stop secured on the flange and projecting within the seat, a pin journaled through the edge of the flange near the stop and formed with a notch in its side within the recess, of an open friction-ring mounted loosely in the seat with its opposite ends in thrusting engagement respectively with the stop and with one side of the notch in the pin, an arm secured on the pin outside the flange, an adjusting-screw in the extremity of the arm, a collar movable on the sleeve, a spline secured therein and movable in a seat formed on the sleeve, said spline terminating beyond the collar in the form of a wedge, and lever mechanism arranged to move the collar with the wedge portion of the spline in engagement with the adjusting-screw, whereby the arm and pin are actuated to expand the ring into frictional engagement with the wall of the recess in the gear, substantially as described and for the purpose specified.

SHERMAN C. SCHAUER.

Witnesses:
AUG. H. TUECHTER,
R. S. CARR.